United States Patent Office 2,984,577
Patented May 16, 1961

2,984,577
PROCESS FOR THE PRODUCTION OF BORON PHOSPHIDE

Forrest V. Williams, Dayton, Ohio, assignor to Monsanto Chemical Company, St. Louis, Mo., a corporation of Delaware No Drawing. Filed Oct. 24, 1957, Ser. No. 692,056

8 Claims. (Cl. 106—65)

The present invention relates to a new method for the production of boron phosphide and to new crystalline combinations of boron phosphide with alumina.

It is an object of this invention to provide a new method for the production of boron phosphide, BP, in the form of a well crystallized, hard, thermally stable and chemical inert material. It is a further object to provide new and highly useful abrasive materials based upon the said boron phosphide and including the combination of the said boron phosphide together with alumina. Such compositions have been found to be highly abrasive and chemically resistant and to exist in the form of granular crystalline particles which are particularly suitable for use as an abrasive material. Further objects and advantages of my invention will be apparent from the following description.

The present process for the production of crystalline boron phosphide as well as combinations of the same together with alumina is based upon the reaction of aluminum phosphide with a boron halide such as boron trichloride. The aluminum phosphide used as the starting material in the present process may be obtained in various ways such as by the direct reaction of elemental aluminum and phosphorus, or by the reduction of various compounds containing aluminum and phosphorus such as the various aluminum phosphates which may be reduced by the use of carbon, sodium, etc. However, the preparation of aluminum phosphide is not a part of the present invention.

When the preliminary preparation of the aluminum phosphide is carried out by beginning with the elemental forms of aluminum and phosphorus, the reaction may be conducted so as to obtain either a pure aluminum phosphide, or an intimate admixture of aluminum phosphide with controlled proportions of alumina. The control of such proportions of alumina is accomplished by regulating the amount of oxygen which is present during the reaction of the aluminum and phosphorus.

The present process makes use of aluminum phosphide, which may also contain any desired proportion of alumina, for reaction with boron trichloride. If desired, boron trifluoride or boron tribromide may similarly be employed. The reaction of these two components is preferably conducted in the temperature range of from 300° C. to 2500° C., or preferably from 600° C. to 2000° C. It is found that at these temperatures the mixture is transformed with the substantially complete conversion of the aluminum phosphide to a cubic crystalline form of boron phosphide while at the same time evolving aluminum chloride. The alumina which may be present in the starting material at this time is unaffected by the boron trichloride and remains as a crystalline component in intimate admixture with the boron phosphide. The said reaction of the aluminum phosphide with boron trichloride may be conducted in a high temperature furnace, although it is also possible to conduct the entire process beginning with metallic aluminum in a single vessel by first preparing the aluminum phosphide, and then passing boron trichloride into contact therewith in the same vessel. It is essential, however, that the aluminum phosphide shall be intimately contacted by the stream of gaseous boron trichloride. On a small scale this is conveniently accomplished by charging the aluminum phosphide, which may contain alumina therewith, in a crucible which is placed in a quartz tube located in a furnace. The quartz tube is connected to a source of boron trichloride which then reacts with the aluminum phosphide to yield the desired boron phosphide. The by-product obtained in this reaction is aluminum chloride, which at the reaction temperature of 900° C. to 1000° C., is evolved in vapor form and may be collected in a recovery system. If it is desired to prepare a very pure product, the boron phosphide, with or without alumina present, may be subjected to an acid washing, e.g., with nitric acid, and a final water wash.

The time required for the present process is dependent upon the temperature and also the degree of subdivision of the aluminum phosphide. The degree of subdivision controls the ease with which the gaseous boron trichloride penetrates the mass of solid reactant.

Boron phosphide as herein prepared is a highly crystalline material with a cubic crystalline structure having a unit cell length of about 4.537 Angstrom units. Its hardness lies between 8 and 9 on Mohs' scale (diamond equals 10). It is however, not as hard as silicon carbide. Thus it will scratch and abrade quartz, porcelain, agate and cemented tungsten and possibly sapphire. When exposed to a flame at 1200° C. in air it will not burn. A thin coating of boron phosphate apparently forms on the exposed surface which coating protects the phosphide against further penetration of air and oxygen at these high temperatures. While I have been unable to melt the phosphide, from theoretical considerations it should melt about 3000° C. or higher. The above statements with regard to the hardness of boron phosphide is likewise applicable to the crystalline admixtures of the boron phosphide with controlled proportions of alumina as described above.

Cubic boron phosphide as prepared by me is not attacked by any reagent which I have tried. It is completely stable to boiling nitric acid and to boiling aqua regia. It was impossible to burn it in an atmosphere of chlorine at three atmospheres pressure even when red phosphorus was used as an initiator.

The present form of crystalline boron phosphide, per se, and the combination of boron phosphide with alumina are useful as abrasives, such as grinding compounds and in the manufacture of sandpaper. These compositions may also be used to prepare various types of chemical apparatus including crucibles, refractories and parts for jet engines such as turbine deflectors which are normally exposed to high temperatures. By reason of the extreme hardness of the product these objects are resistant to solid particles, particularly fly ash which may be present in the high-temperature gases of a gas turbine.

In order to form shaped objects of boron phosphide, with or without the presence of alumina, I begin by pressing and shaping a mass of aluminum phosphide into the desired shape. This may readily be accomplished by using a graphite mold or form to contain the aluminum phosphide. A gaseous boron halide vapor is then introduced to the aluminum phosphide at a temperature between 600° C. and 2000° C. This results in the transformation of the aluminum phosphide to boron phosphide. The reaction commences at the surface of the article, forming the compound BP thereon, and as the treatment is continued the boron halide, for example, boron trichloride penetrates the surface and gradually works its way into the center of the article, ultimately converting the entire mass of aluminum phosphide to boron phosphide. If the aluminum phosphide employed in this step has alumina present, the alumina is retained in the product in intimate crystalline admixture.

The shaped product described above is a hard abrasive article which may be subjected to red heat in air for extended periods without loss of weight. A thin coating of boron phosphate, apparently forms on the exposed surface, which coating protects the phosphide against further penetration of air or oxygen at these high temperatures. While I have been unable to melt the crystalline boron phosphide, or its combinations with alumina, from theoretical considerations, and by analogy with data on similar compounds, the products of the present invention should melt at a temperature greater than about 3000° C.

It is also possible, of course, to sinter objects pressed from the boron phosphide powder, with or without the presence of alumina, as prepared by the methods of the present invention. When compressing the powder into pressed objects, the green strength of the piece will depend upon the amount of pressure exerted in the die. If necessary, organic binders, e.g., resinous polymers, may be employed in small quantities to increase the green strength of the piece. The pressed article of boron phosphide so prepared is then subjected to a temperature ranging upwardly from about 1000° C. to about 2500° C., preferably in an atmosphere of phosphorus vapor at suitable pressure, for a sufficient length of time to develop the required strength.

The following examples illustrate specific embodiments of the present invention.

*Example 1*

The preparation of aluminum phosphide as the starting material in carrying out the present invention was conducted by following the procedure in Inorganic Syntheses by J. C. Bailar, volume IV, page 23 (1953).

A mixture consisting of 6 grams of finely divided dry red phosphorus (0.197 gram atom) and 4.5 grams (0.167 gram atom) of flake-type aluminum powder of low oxide content was placed in an iron crucible of 25 ml. capacity. The crucible was provided with a close fitting cover. The crucible containing the mixture was placed on an iron plate in order to conduct away part of the heat of the reaction. With the cover removed from the crucible, a piece of magnesium ribbon was inserted into the mixture and the ribbon ignited. The crucible cover was immediately set in place. A vigorous exothermic reaction occurred after which the entire crucible was placed in a dry box and the aluminum phosphide removed as a dark colored, friable, rather fluffy mass. Because of the presence of a small amount of air in the present combustion process, a portion of the aluminum was found to have been transformed to alumina, in the proportion of about 10% by weight in the product. The alumina was in intimate admixture with the aluminum phosphide.

*Example 2*

The method of Example 1 is modified by separately heating a source of white phosphorus in order to obtain a stream of elemental phosphorus. The phosphorus vapor is then introduced to a mass of powdered aluminum in a vessel provided with an inert gas system (helium) to produce substantially pure aluminum phosphide without the presence of appreciable proportions of alumina.

*Example 3*

In order to obtain boron phosphide from aluminum phosphide a porcelain boat was charged with 7.44 grams of aluminum phosphide. The porcelain boat was placed in a quartz tube furnace into which a stream of boron trichloride was then passed. The quartz tube was located horizontally in an electric tube furnace with about 10 inches of the tube projecting on the outlet side beyond the furnace. The furnace was gradually heated until that part of the tube adjacent to the crucible had reached 962° C. The temperature of the crucible and tube was read by means of a thermocouple fastened to the outside of the quartz tube opposite the middle of the crucible or boat.

The heating of the quartz tube and the porcelain boat therein containing aluminum phosphide caused the reactant boron trichloride to combine with the aluminum phosphide, forming boron phosphide with the evolution of aluminum chloride. The aluminum chloride was condensed in the cooler part of the quartz tube which was located outside the heating zone of the furnace. The porcelain boat and contents were above a temperature of 800° C. for approximately 2 hours and above 900° C. for about one hour.

Upon completion of the heating described above, the quartz tube was cooled and the porcelain boat and product were removed. The original quantity of aluminum phosphide had decreased in weight by 1.75 grams indicating about 84% conversion to boron phosphide. The sample of product taken from the procelain boat was found to be insoluble in boiling nitric acid.

A sample of the boron phosphide was examined by X-ray diffraction and found to have a cubic structure with a unit cell length of about 4.537 Augstrom units. Typical interplanar spacing and intensity data of the prominent lines were as follows (Ni filter, CuK alpha) radiation:

| $d$ value (A.) | Intensity $I/I_0$ |
|---|---|
| 2.63 | 100 |
| 2.28 | 19 |
| 1.61 | 30 |
| 1.37 | 19 |
| 1.31 | 3 |
| 1.14 | 2 |
| 1.04 | 6 |
| 1.02 | 4 |
| 0.928 | 5 |
| 0.871 | 6 |
| 0.803 | 3 |

*Example 4*

A sample of the aluminum phosphide containing about 10% alumina as obtained from Example 1 was treated by the method of Example 3 in order to transform the said aluminum phosphide to boron phosphide. The product thus obtained consisted of a mixture of about 90% by weight of boron phosphide and about 10% by weight of alumina in an intimate crystalline admixture. This product was subjected to X-ray diffraction and was found to be characterized by an unusually small average crystallite size of about 0.1 micron.

The product of this example, as well as that of Example 3 is a dense black material which had a Mohs' hardness of about 9.

*Example 5*

Finely divided aluminum phosphide is pressed into a 9-mm. I.D. by 22 mm. deep zirconia crucible by pressing the aluminum phosphide into place with a graphite rod which is left in the center of the mass thus forming a cup-shaped crucible. The assembly is then placed in a ¾-inch quartz tube 10 inches long located horizontally in an electric furnace. The quartz tube is connected to a source of boron trichloride which is passed through the tube at a pressure of about 1 atmosphere. The tube is heated to a temperature of about 960° during the reaction period. It is found that the aluminum phosphide reacts readily with the boron trichloride forming boron phosphide with the evolution of aluminum chloride. The aluminum chloride condenses on the outlet tube outside the furnace. The boron phosphide crucible thus formed is found to be resistant to the action of nitric acid and to withstand heating to a red heat without substantial change.

Example 6

The method of Example 5 is modified by first forming the aluminum phosphide crucible in situ, by starting with a pressed mass of aluminum powder which is reacted with phosphorus vapor in the presence of a controlled amount of oxygen. The aluminum phosphide thus formed contains about 10% of alumina in intimate crystalline admixture with the aluminum phosphide. The entire crucible mold form and the aluminum phosphide is placed in the electric furnace and then subjected to boron trichloride vapors, thus forming a crucible shaped body of boron phosphide. It is found that the boron trichloride does not affect the alumina so that the final product consists of an intimate admixture of the alumina with the boron phosphide.

What is claimed is:

1. Process for the preparation of crystalline boron phosphide which comprises contacting aluminum phosphide with a gaseous boron halide at a temperature of from 300° C. to 2500° C. to obtain crystalline boron phosphide.

2. Process for the preparation of crystalline boron phosphide which comprises contacting aluminum phosphide with boron trichloride at a temperature of from 300° C. to 2500° C. to obtain crystalline boron phosphide.

3. Process for the preparation of crystalline boron phosphide which comprises contacting aluminum phosphide with a gaseous boron halide at a temperature of from 600° C. to 2000° C. to obtain crystalline boron phosphide.

4. Process for the preparation of crystalline boron phosphide which comprises contacting aluminum phosphide with boron trichloride at a temperature of from 600° C. to 2000° C. to obtain crystalline boron phosphide.

5. Process for the production of shaped objects which comprises forming a mass of finely divided aluminum phosphide into the desired shape and thereafter heating the said object at a temperature of from 300° C. to 2500° C. while contacting the said object with vapors of a boron halide whereby at least a portion of the said aluminum phosphide is converted to boron phosphide.

6. Process for the production of shaped objects which comprises forming a mass of finely divided aluminum phosphide into the desired shape and thereafter heating the said object at a temperature of from 300° C. to 2500° C. while contacting the said object with vapors of boron trichloride whereby at least a portion of the said aluminum phosphide is converted to boron phosphide.

7. Process for the production of shaped objects which comprises forming a mass of finely divided aluminum phosphide into the desired shape and thereafter heating the said object at a temperature of from 600° C. to 2000° C. while contacting the said object with vapors of a boron halide whereby at least a portion of the said aluminum phosphide is converted to boron phosphide.

8. Process for the production of shaped objects which comprises forming a mass of finely divided aluminum phosphide into the desired shape and thereafter heating the said object at a temperature of from 600° C. to 2000° C. while contacting the said object with vapors of boron trichloride whereby at least a portion of the said aluminum phosphide is converted to boron phosphide.

References Cited in the file of this patent

UNITED STATES PATENTS

| | | |
|---|---|---|
| 2,467,647 | Alexander | Apr. 19, 1949 |
| 2,798,989 | Welker | July 9, 1957 |
| 2,822,309 | Hall | Feb. 4, 1958 |

OTHER REFERENCES

Mellor: "Comprehensive Treatise on Inorganic and Theoretical Chemistry," Longmans, Green and Co., N.Y., 1928, vol. 8, pp. 843–845.